(12) United States Patent
Hendricks et al.

(10) Patent No.: US 9,060,272 B2
(45) Date of Patent: Jun. 16, 2015

(54) METHOD AND APPARATUS FOR ENTITLEMENT CONTROL VIA AN ENDPOINT DEVICE

(75) Inventors: Patrick Hendricks, Douglasville, GA (US); Yehoshuva Arasavelli, Redmond, WA (US); Feza Buyukdura, Fairview, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 193 days.

(21) Appl. No.: 13/296,993

(22) Filed: Nov. 15, 2011

(65) Prior Publication Data

US 2013/0124728 A1 May 16, 2013

(51) Int. Cl.
*G06F 15/173* (2006.01)
*H04W 12/06* (2009.01)
*H04L 29/06* (2006.01)

(52) U.S. Cl.
CPC ........... *H04W 12/06* (2013.01); *H04L 63/0884* (2013.01)

(58) Field of Classification Search
CPC .......................... H04L 63/0884; H04W 12/06
USPC ......... 709/225, 227; 455/412, 414; 726/6, 26; 370/310, 328, 338
See application file for complete search history.

(56) References Cited

U.S. PATENT DOCUMENTS

| | | | |
|---|---|---|---|
| 6,516,316 B1* | 2/2003 | Ramasubramani et al. | 1/1 |
| 2002/0183045 A1* | 12/2002 | Emmerson et al. | 455/412 |
| 2009/0187980 A1* | 7/2009 | Tung | 726/6 |
| 2010/0107259 A1* | 4/2010 | Sullivan | 726/26 |
| 2011/0283001 A1* | 11/2011 | Jung et al. | 709/227 |
| 2011/0289573 A1* | 11/2011 | Seidl et al. | 726/7 |
| 2012/0036441 A1* | 2/2012 | Basir et al. | 715/734 |

* cited by examiner

*Primary Examiner* — Hitesh Patel

(57) ABSTRACT

A method and non-transitory computer readable medium for providing entitlement control via an endpoint device are disclosed. For example, the method detects an attempt to access a non-network monitored service at an endpoint device, determines whether the endpoint device is authorized to access the non-network monitored service by sending a query to a service provider network, and provides an access to the non-network monitored service if the endpoint is authorized.

9 Claims, 4 Drawing Sheets

METHOD AND APPARATUS FOR ENTITLEMENT CONTROL VIA AN ENDPOINT DEVICE

The present disclosure relates generally to entitlement control and, more particularly, to a method and apparatus for entitlement control via an endpoint device.

BACKGROUND

Mobile devices obtain certain pre-defined information from a communication network for the purpose of being authenticated and be allowed to interact with the communication network, based on various telecommunication industry standards. Notably, these authentications initiated by the network are for network monitored services such as voice communications, messaging and basic data access. Thus, once authenticated the mobile device may utilize basic functions like voice communications, messaging and basic data access, as noted above.

Some authentications for other types of services are authorized by pushing information over the air. For example, the network may push entitlement information continuously over the air to the mobile device. However, pushing information over the air suffers from drawbacks such as not being reliable, timely and efficient.

SUMMARY

In one embodiment, the present disclosure provides a method and non-transitory computer readable medium and apparatus for providing an entitlement control via an endpoint device. For example, the method detects an attempt to access a non-network monitored service at an endpoint device, determines whether the endpoint device is authorized to access the non-network monitored service by sending a query to a service provider network, and provides an access to the non-network monitored service if the endpoint is authorized.

The present disclosure also provides a second embodiment of a method for providing an entitlement control via an endpoint device. For example, the method receives a request for authorization to access a non-network monitored service from an endpoint device via a query, determines whether a match to the query is found in a subscriber information database, and if the match is found for the query in the subscriber information database, then sends an authorization to the endpoint device to access the non-network monitored service.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for providing entitlement control via an endpoint device. As noted above, most services may be monitored, authenticated and tracked by a service provider network, such as voice communications, messaging communications and basic data access.

However, some services provided to an endpoint device can be very difficult to monitor and track by the service provider network. These types of services may be referred to herein as "non-network monitored services." Some examples of non-network monitored services may include tethering services, applications or features of an application that are executed entirely by the endpoint device, such as for example, a video game or a multiplayer feature of the video game, and the like. In other words, these non-network monitored services do not rely upon, or require, a server in the network for operation. For example, with respect to tethering, a second endpoint device may connect to a first endpoint device directly, while the first endpoint device is communicating with the network. In the tethering arrangement, the service provider network has a very difficult time knowing that the data being accessed by the first endpoint device is actually being transferred to a second endpoint device that is tethered to the first endpoint device. Thus, in the tethering arrangement, the second endpoint device is actually using the first endpoint device's service with the service provider network. In other words, the first endpoint device is able to provide service to other second endpoint devices, thereby increasing the operating cost to the service provider network without the benefit of collecting a service fee from the first endpoint device, e.g., providing tethering service to other endpoints.

In another example, an endpoint device may have downloaded a video game onto its memory. The video game may include a feature, such as for example, a multiplayer feature to play with another endpoint device over a personal area network, such as Bluetooth or a Wi-Fi network. Currently, the service provider would have no way to authorize or control the use of the multiplayer feature as the video game is an application running entirely on both of the endpoint devices over a personal area network that does not interact with the service provider network.

Embodiments of the present disclosure are directed to a method and non-transitory computer readable medium for providing entitlement control via an endpoint device that would allow the service provider network to leverage the endpoint device as a proxy for authorization and greater control for the non-network monitored services. As a result, the service provider network may maintain control over the non-network monitored services and capitalize on these types of services.

Figure 1:
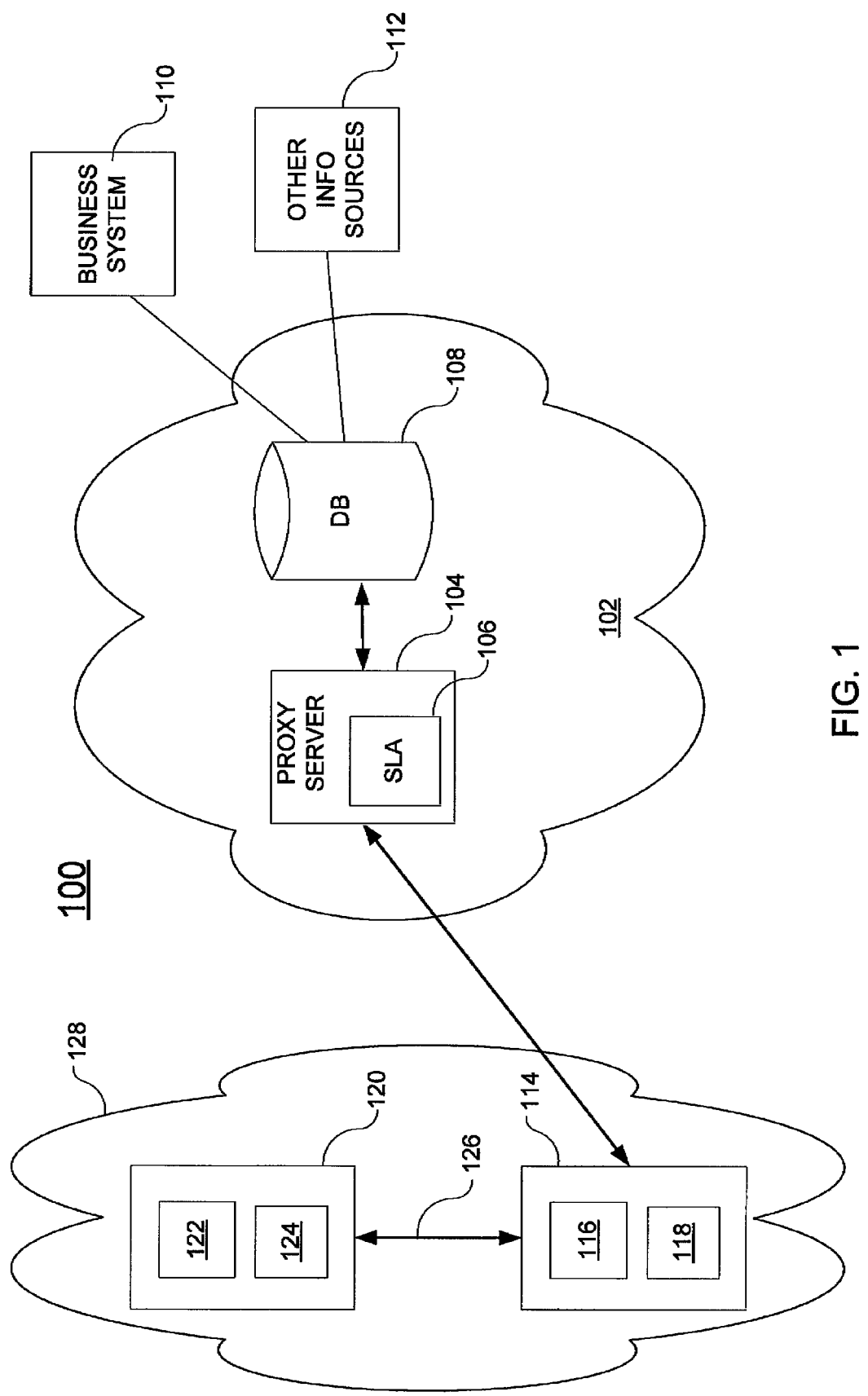
FIG. 1 illustrates one example of a communications network of the present disclosure.

FIG. 1 is a block diagram depicting one example of a communications network 100. The communications network 100 may include an Internet protocol (IP) core network 102. The IP network 102 may be operated by a service provider.

In one embodiment, the IP network 102 may comprise a core network, an access network or any other type of communication network. In one embodiment, the IP network 102 may be any type of IP network such as an Internet Protocol (IP) Multimedia Subsystem (IMS) network, an asynchronous transfer mode (ATM) network, a wireless network, a cellular network, a long term evolution (LTE) network, and the like, related to the current disclosure. It should be noted that an IP network is broadly defined as a network that uses Internet Protocol to exchange data packets. Additional exemplary Internet Protocol (IP) networks include Voice over Internet Protocol (VoIP) networks, Service over Internet Protocol (SoIP) networks, and the like. The present disclosure is not limited to any particular network architecture.

In one embodiment, the IP network 102 may comprise a proxy server 104 and a database 108. The proxy server 104 may also include a service layer authorization (SLA) module 106.

In one embodiment, the database 108 may be a subscriber or network information database that includes information about subscribers of the IP network. For example, the database 108 may store information about what types of services the subscriber is authorized to access, including non-network monitored services, such as for example, tethering or peer to peer applications, such as for example, gaming applications, some video calling, softphone calling, some messaging, or any other type of service that the network may not be able to detect, and the like.

In one embodiment, the services stored in the database 108 may be associated with a unique universal resource locator (URL). As will be discussed below, an entitlement request may be authorized based upon whether a URL for a particular service in the entitlement request matches a URL for one of the services that a subscriber is authorized to access.

In one embodiment, the database 108 may be configured with the subscriber information from one or more sources 110 and 112. For example, the source 110 may be one or more business systems (e.g., a provisioning system, a billing system, a third party service provider system, and the like) and the source 112 may be other types of various sources, including subscriber provided information, e.g., provided during a service sign-up process via website operated by the service provider and the like.

In one embodiment, one or more endpoint devices 114 and 120 may be in communication with the IP network 102. In one embodiment, the endpoint devices 114 and 120 may be any type of endpoint device associated with a mobile device service. In other words, the endpoint device 114 and 120 may include cellular telephones, smart phones, tablet computers, laptop computers, net book computers, and the like or non-mobile devices executing mobile device service applications, such as for example, desktop computers with mobile device service applications, and the like.

In one embodiment, the endpoint device 114 may include an SLA module 116 and an application (APP) module 118. The endpoint device 120 may also include an SLA module 122 and an application (APP) module 124. It should be noted that the SLA modules 116 and 122 and the application modules 118 and 124 may all be embodied as hardware. For example, they may be computer program instructions stored in a physical memory and executed by a processor. In one embodiment, the application module 124 may include computer readable instructions to execute various non-network monitored services, such as for example, tethering services, gaming services and the like. Although only two endpoint devices 114 and 120 are illustrated in FIG. 1, any number of endpoint devices may be deployed.

As discussed above, some services may not be monitored by the service provider network, e.g., the IP network 102. As illustrated in FIG. 1, the endpoint device 120 may tether to the endpoint device 114 to gain access to data over the IP network 102. Notably, the endpoint device 120 is not a subscriber to any services provided by the IP network 102.

In one embodiment, the endpoint device 120 may tether to the endpoint device 114 via a physical connection over a physical interface as shown by connection 126 or a wireless connection via a personal area network (PAN) or Wi-Fi connection as illustrated by cloud 128. In one embodiment, the cloud 128 may represent any other network other than the IP network 102 of the service provider. Any communication over the connection (physical or wireless) 126 or within the cloud 128 cannot be monitored by the IP network 102. As a result, currently the service provider of the IP network 102 has no control over any services executed by the endpoint device 114 over the connection 126 or within the cloud 128.

Embodiments of the present disclosure resolve this issue by leveraging the endpoint device 114 to provide an entitlement control on behalf of the IP network 102 of the service provider. In one embodiment, the endpoint device 114 may be configured with the SLA module 116.

The SLA module 116 may be programmed to detect when the endpoint device 114 attempts to access a non-network monitored service, e.g., executing an application in the application module 118. In one embodiment, the detection may be based upon simply detecting the application being executed or based upon detection of an attempt to communicate over a particular interface using a particular application, e.g., a non-network monitored service application. For example, the SLA module 116 may detect if the endpoint device 120 is trying to communicate with the endpoint device 114 using a tethering service application over a universal serial bus (USB) connection or over a Bluetooth communication interface in the cloud 128, and the like.

When the attempt by the endpoint device 120 is detected by the SLA module 116, the SLA module 116 may send an entitlement request to the proxy server 104 that is also configured with an SLA module 106. The entitlement request may be sent using any type of secure protocol.

In one embodiment, the entitlement request may be made via a hypertext transfer protocol (HTTP) request message. The HTTP request message may include a unique URL associated with the non-network monitored service that the endpoint device 114 is trying to access. It should be noted that although one example uses HTTP, any similar type of protocol may be used within the scope of the present disclosure. In other words, the present disclosure is not only limited to using HTTP.

In one embodiment, each non-network monitored service may be associated with a unique URL. The subscriber may subscribe with the service provider to have access to one or more of the non-network monitored services. This subscription information may be stored in the database 108 for each subscriber of the service provider's IP network 102. For example, for each subscriber, a list of URLs may be included for each of the services the subscriber has authorization to access.

Referring back to the above example, assume the subscriber of the endpoint device 114 has subscribed to a tethering service. The URL for the tethering service may be stored under the information associated with the subscriber of the endpoint device 114. As a result, when the endpoint device 114 detects an attempt to access a tethering service, the SLA 116 may send an entitlement request for the tethering service to the proxy server 104. In one embodiment, the entitlement request may be an HTTP request message including the URL for the tethering service. The SLA module 106 may decipher the HTTP request message with the URL and, in turn, instructs the proxy server 104 to check the database 108 to determine if a matching URL is found under the subscriber's information.

If a match is found, the proxy server 104 may return an HTTP authorization message back to the endpoint device 114. For example, the HTTP message may be an HTTP 200 OK message. If no match is found, the proxy server 104 may return an HTTP 400 error message and the endpoint device 114 may be denied access to the non-network monitored service.

It should be noted that in one embodiment, the present disclosure utilizes the entitlement query on a per use basis. As a result, bandwidth is saved as information is only sent back and forth when needed unlike over the air methods that constantly push information to endpoint devices. As a result, the present disclosure also provides a more efficient method for entitlement control via an endpoint device.

It should be noted that the network 100 has been simplified. For example, the network 100 may include other network elements (not shown) such as border elements, routers, switches, call control elements, policy servers, security devices, application servers, firewalls, gateways, a content distribution network (CDN) and the like.

Figure 2:
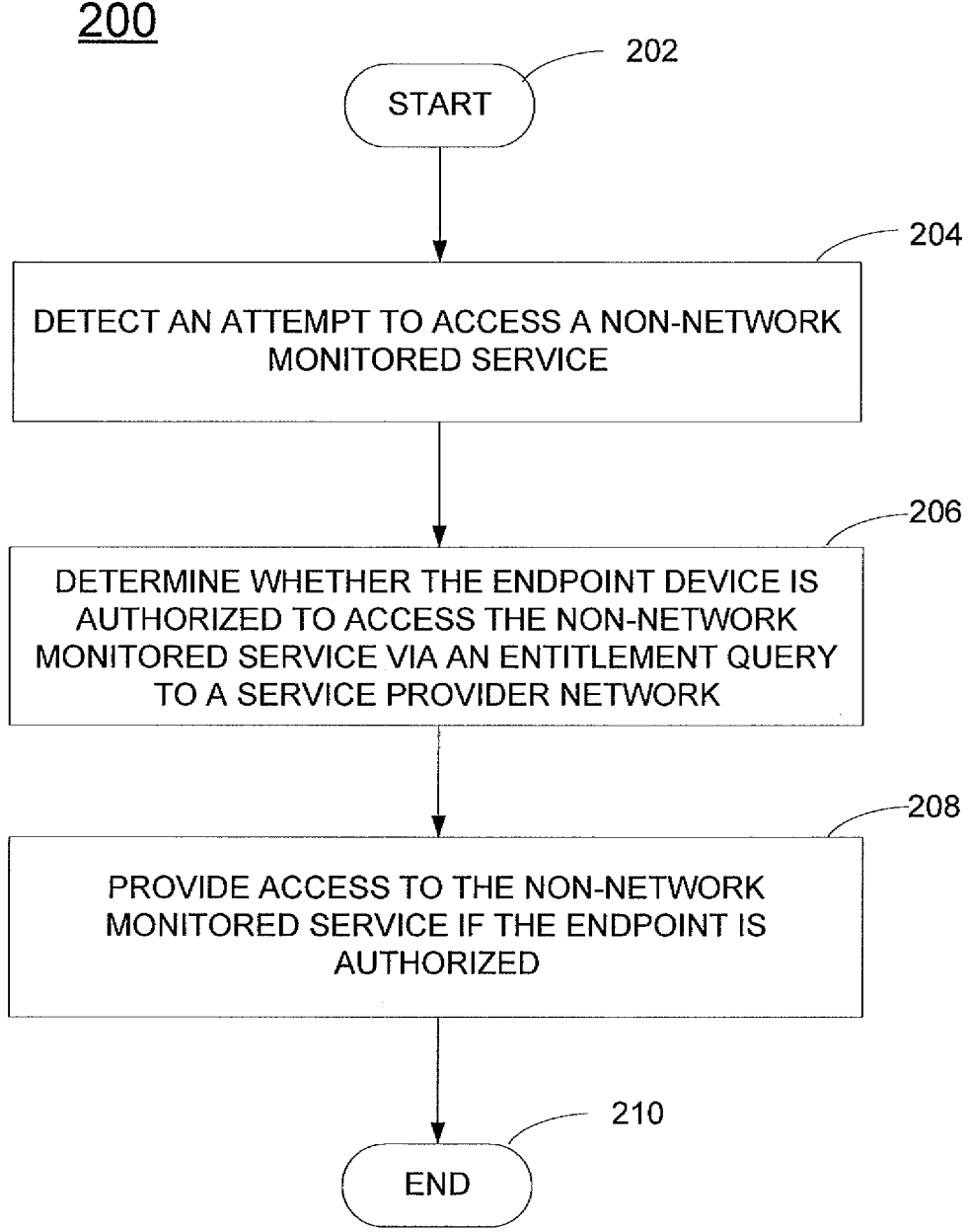
FIG. 2 illustrates an example flowchart of one embodiment of a method for providing entitlement control via an endpoint device.
Figure 4:
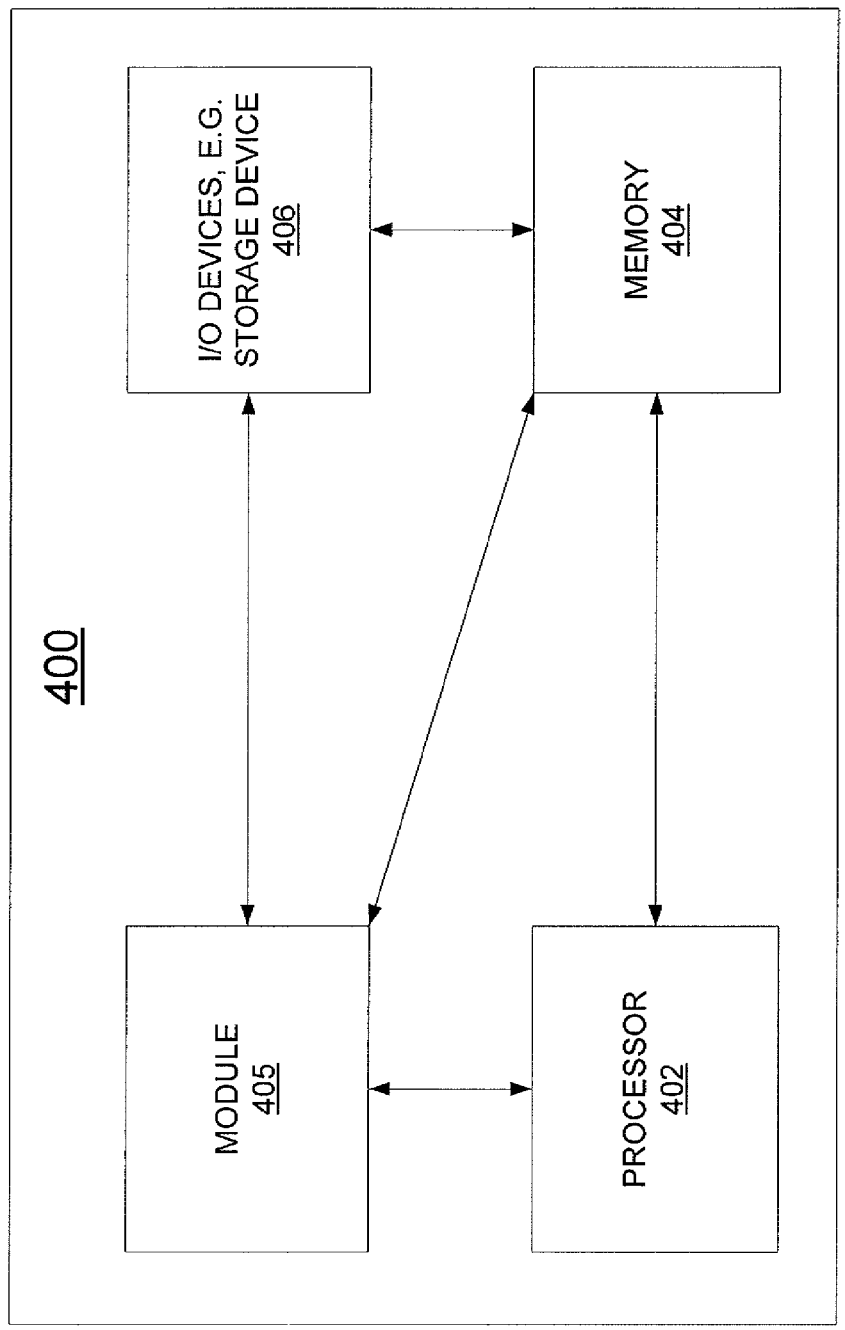
FIG. 4 illustrates a high-level block diagram of a general-purpose computer suitable for use in performing the functions described herein.

FIG. 2 illustrates a flowchart of a method 200 for providing entitlement control via an endpoint device. In one embodiment, the method 200 may be performed by the endpoint device 114 or a general purpose computing device or computer as illustrated in FIG. 4 and discussed below.

The method 200 begins at step 202. At step 204, the method 200 detects an attempt to access a non-network monitored service. For example, an SLA module within an endpoint device may detect when the endpoint device is attempting to access a non-network monitored service. In one embodiment, the detection may be based upon simply detecting the application being executed or based upon detection of an attempt to communicate over a particular interface. For example, the endpoint device is detected as trying to communicate with another endpoint device using a tethering service application over a USB connection or over a Bluetooth communication interface, and the like.

At step 206, the method 200 determines whether the endpoint device is authorized to access the non-network monitored service via an entitlement query to a service provider network. In one embodiment, the entitlement request may be made via an HTTP request message. The HTTP request message may include a unique URL associated with the non-network monitored service that the endpoint device is trying to access.

In one embodiment, each non-network monitored service is associated with a unique URL. The subscriber may subscribe with the service provider to have access to one or more of the non-network monitored services. This subscription information is stored in a database, e.g., the database 108, for each subscriber of the service provider's network, e.g., the IP network 102. For example, for each subscriber, a list of URLs is included for the services the subscriber has authorization to access. In one embodiment, a proxy server, e.g., the proxy server 104, may attempt to find a URL for an authorized service for the subscriber in the database that matches the URL in the HTTP request message.

In one embodiment, the entitlement query may also check to see if other conditions are met to determine if the endpoint is authorized to access the non-network monitored service. For example, additional conditions for authorization may include time of day, number of uses, and the like.

At step 208, the method 200 provides access to the non-network monitored service if the endpoint is authorized. For example, if a match to the URL in the HTTP request message is found in the database for the authorized services for the subscriber, then an HTTP authorization message from a proxy server, e.g., the proxy server 104, is received by the endpoint device. For example, the HTTP message may be an HTTP 200 OK message. If no match is found, then an HTTP 400 error message from a proxy server, e.g., the proxy server 104, may be received by the endpoint device and the endpoint device is denied access to the non-network monitored service.

In one embodiment, by leveraging the endpoint device to provide entitlement control for non-network monitored services, the service provider may now capitalize on the non-network monitored services each time the non-network monitored services are accessed and provide a greater control over these non-network monitored services. For example, once a subscriber signed up on a monthly basis for a tethering service, the service provider would have a very difficult time knowing when the endpoint is using the tethering service or how many endpoints are using the tethering service at any given time. However, using embodiments of the present disclosure, the service provider may now have new methods to capitalize on non-network monitored services, such as for example, charging on a per use basis, charging for access to the non-network monitored service by unregistered endpoint devices, charging for access to the non-network monitored service when there is a greater number of endpoint devices than previously allowed, e.g., greater than N number of tethered endpoint devices, where N was previously defined by the service provider, and the like.

For example, the service provider may charge on a monthly basis for tethering, but then charge on a per use basis for endpoint devices that are not registered with the subscriber. To illustrate, when the endpoint device sends the entitlement request, the entitlement request may also include what devices are trying to access the service associated with the URL. As a result, if a friend of the subscriber is attempting to tether to the subscriber's endpoint device, the service provider would be notified via the entitlement request (e.g., by including a media access control (MAC) identification address of the endpoint device). As a result, the service provider may charge the subscriber an additional fee for tethering to endpoint devices that are not previously registered with the subscriber.

In addition, the additional level of control allows the service provider to limit which endpoint devices and how many endpoint devices at a given time period may access the non-network monitored service. The method 200 then proceeds to step 210, where the method 200 ends.

Figure 3:
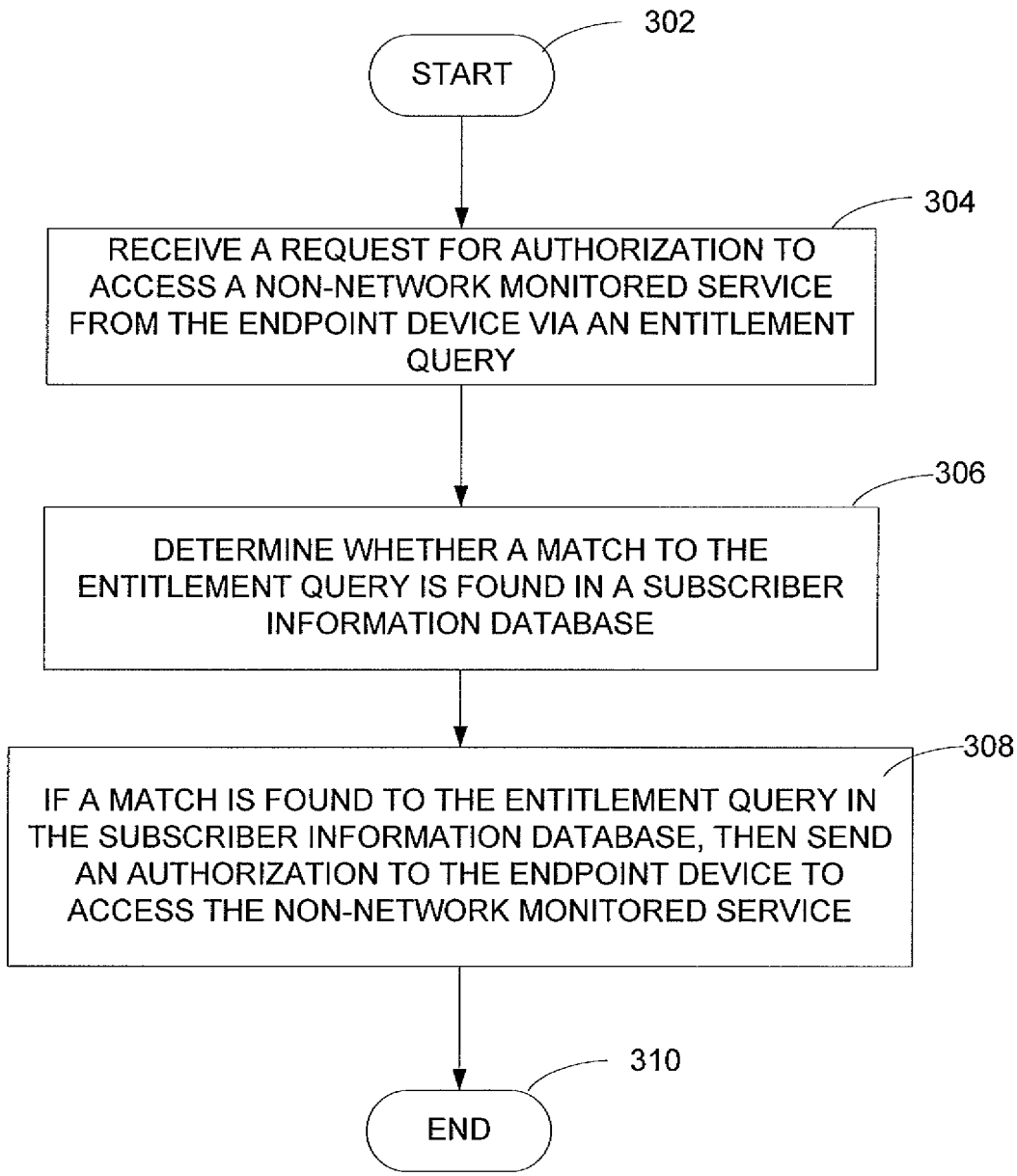
FIG. 3 illustrates an example flowchart of a second embodiment of a method for providing entitlement control via an endpoint device.

FIG. 3 illustrates a flowchart for a second embodiment of a method 300 for providing an entitlement control via an endpoint device. In one embodiment, the method 300 may be performed by the proxy server 104 or a general purpose computing device or computer as illustrated in FIG. 4 and discussed below.

The method 300 begins at step 302. At step 304, the method 300 receives a request for authorization to access a non-network monitored service from an endpoint device via an entitlement query. For example, an SLA module within an endpoint device may detect when the endpoint device is attempting to access a non-network monitored service. In one embodiment, the detection may be based upon simply detecting the application being executed or based upon detection of an attempt to communicate over a particular interface. For example, the endpoint device is detected as trying to communicate with another endpoint device using a tethering service application over a USB connection or over a Bluetooth communication interface, and the like.

Once the attempt to access the non-network monitored service is detected, the network may receive a request for authorization to access the non-network monitored service, e.g., a tethering service or a gaming application. In one embodiment, the request may be received by a proxy server, e.g., the proxy server 104. In one embodiment, the entitlement request is made via an HTTP request message.

At step 306, the method 300 determines whether a match to the entitlement query is found in a subscriber information database. As noted above, the entitlement request is made via an HTTP request message. In one embodiment, the HTTP request message may include a unique URL associated with the non-network monitored service that the endpoint device is trying to access.

In one embodiment, each non-network monitored service is associated with a unique URL. The subscriber may subscribe with the service provider to have access to one or more of the non-network monitored services. This subscription information is stored in a database, e.g., the database 108, for each subscriber of the service provider's network, e.g., the IP network 102. For example, for each subscriber, a list of URLs is included for the services that the subscriber has authorization to access. In one embodiment, a proxy server, e.g., the proxy server 104, may attempt to find a URL for an authorized service for the subscriber in the database that matches the URL in the HTTP request message.

In one embodiment, the entitlement query may also check to see if other conditions are matched to determine if the endpoint is authorized to access the non-network monitored service. For example, additional conditions for authorization may include time of day, number of uses, and the like.

At step 308, if a match is found to the entitlement query in the subscriber information database, then an authorization is sent to the endpoint device to access the non-network monitored service. For example, if a match to the URL in the HTTP request message is found in the database for the authorized service for the subscriber, a proxy server, e.g., the proxy server 104, will send an HTTP authorization message back to the endpoint device. For example, the HTTP message is an HTTP 200 OK message.

Alternatively, if no match is found, the proxy server will send a HTTP 400 error message and the endpoint device is denied access to the non-network monitored service. It should be noted that the denial of service actually occurs at the endpoint device. In other words, the SLA on the endpoint device will cause the execution of the non-network monitored service to be denied, thereby relieving the network service provider of the task of denying the non-network monitored service. For example, the endpoint device may simply disallow another endpoint device from tethering to the endpoint device.

In one embodiment, by leveraging the endpoint device to provide entitlement control for non-network monitored services, the service provider will now be able to capitalize on the non-network monitored services each time the non-network monitored services are accessed and provide a greater control over these non-network monitored services. For example, once a subscriber signed up on a monthly basis for a tethering service, the service provider would have a very difficult time knowing when the endpoint is using the tethering service or how many endpoints are using the tethering service at any given time. However, using embodiments of the present disclosure, the service provider will have new ways to capitalize on non-network monitored services, such as for example, charging on a per use basis, charging for access to the non-network monitored service by unregistered endpoint devices, charging for access to the non-network monitored service when there is a greater number of endpoint devices than previously allowed, e.g., greater than N number of tethered endpoint devices, where N was previously defined by the service provider, and the like.

For example, the service provider may charge on a monthly basis for tethering, but then charge on a per use basis for endpoint devices that are not registered with the subscriber. To illustrate, when the endpoint device sends the entitlement request, the entitlement request may also include what devices are trying to access the service associated with the URL. As a result, if a friend of the subscriber is attempting to tether to the subscriber's endpoint device, the service provider would be notified via the entitlement request (e.g., by including a MAC identification address of the endpoint device). As a result, the service provider may charge the subscriber an additional fee for tethering to endpoint devices that are not registered with the subscriber, i.e., the MAC identification address is not a previously registered MAC identification address of an endpoint of the subscriber.

In addition, the additional level of control allows the service provider to limit which endpoint devices and how many endpoint devices at a given time period may access the non-network monitored service. The method 300 then proceeds to step 310, where the method 300 ends.

It should be noted that although not explicitly specified, one or more steps of the method 200 and 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIGS. 2 and 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computing device or computer suitable for use in performing the functions described herein. As depicted in FIG. 4, the system 400 comprises a hardware processor element 402 (e.g., a CPU), a memory 404, e.g., random access memory (RAM) and/or read only memory (ROM), a module 405 for providing entitlement control, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed method(s). In one embodiment, the present module or process 405 for providing entitlement control can be loaded into memory 404 and executed by hardware processor 402 to implement the functions as discussed above. As such, the present module or process 405 for providing entitlement control (including associated data structures) of the present disclosure can be stored on a non-transitory (physical and tangible) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing an access to a tethering service, comprising:
   detecting an attempt to access the tethering service at a first endpoint device where a second endpoint device connects to the first endpoint device while the first endpoint device is communicating with a service provider network, where data that is accessed by the first endpoint device via the service provider network is transferred to the second endpoint device;
   determining, by the first endpoint device, whether the first endpoint device is authorized to access the tethering service by:
      sending a query to the service provider network, wherein the query comprises a hyper text transfer protocol message that comprises a unique identifier associated with the tethering service, wherein the unique identifier comprises a universal resource locator that uniquely identifies the tethering service from among a plurality of non-network monitored services, wherein the non-network monitored services comprise services that do not require a server in the service provider network for operation; and
      receiving an authorization from the service provider network to access the tethering service when a proxy server finds a match to the unique identifier in a subscriber information database; and
   providing, by the first endpoint device, the access to the tethering service when the first endpoint device receives the authorization.

2. The method of claim 1, wherein the first endpoint device comprises an endpoint associated with a mobile device service.

3. The method of claim 1, wherein the detecting comprises detecting an attempt to transmit data over a physical interface.

4. The method of claim 1, wherein the detecting comprise detecting an attempt to transmit data over a network other than the service provider network.

5. A non-transitory computer-readable medium storing instructions which, when executed by a processor of a first endpoint device, cause the processor to perform operations for providing an access to a tethering service, the operations comprising:
   detecting an attempt to access the tethering service at the first endpoint where a second endpoint device connects to the first endpoint device while the first endpoint device is communicating with a service provider network, where data that is accessed by the first endpoint device via the service provider network is transferred to the second endpoint device;
   determining whether the first endpoint device is authorized to access the tethering service by:
      sending a query to a service provider network, wherein the query comprises a hyper text transfer protocol message that comprises a unique identifier associated with the tethering service, wherein the unique identifier comprises a universal resource locator that uniquely identifies the tethering service from among a plurality of non-network monitored services, wherein the non-network monitored services comprise services that do not require a server in the service provider network for operation; and
      receiving an authorization from the service provider network to access the tethering service when a proxy server finds a match to the unique identifier in a subscriber information database; and
   providing the access to the tethering service when the first endpoint device receives the authorization.

6. The non-transitory computer-readable medium of claim 5, wherein the first endpoint device comprises an endpoint associated with a mobile device service.

7. The non-transitory computer-readable medium of claim 5, wherein the detecting comprises detecting an attempt to transmit data over a physical interface.

8. The non-transitory computer-readable medium of claim 5, wherein the detecting comprise detecting an attempt to transmit data over a network other than the service provider network.

9. A method for providing an access to a tethering service, comprising:
   receiving, by a processor of a proxy server deployed in a service provider network, a request for authorization to access the tethering service, wherein the request is received from a first endpoint device via a query, wherein the tethering service comprises a second endpoint device connecting to the first endpoint device while the first endpoint device is communicating with the service provider network, where data that is accessed by the first endpoint device via the service provider network is transferred to the second endpoint device, wherein the query comprises a hyper text transfer protocol message that comprises a unique identifier associated with the tethering service, wherein the unique identifier comprises a universal resource locator that uniquely identifies the tethering service from among a plurality of non-network monitored services, wherein the non-network monitored services comprise services that do not require a server in the service provider network for operation;
   determining, by the processor, whether a match to the query is found in a subscriber information database; and
   when the match is found for the query in the subscriber information database, sending, by the processor, an authorization to the first endpoint device to access the tethering service.

* * * * *